(12) United States Patent
Nacke et al.

(10) Patent No.: US 9,429,101 B2
(45) Date of Patent: Aug. 30, 2016

(54) COMBUSTION ENGINE PISTON AND ENGINE USING SAME

(71) Applicant: Caterpillar Inc., Peoria, IL (US)

(72) Inventors: Robert Nacke, Lafayette, IN (US); Stuart Niese, Lafayette, IN (US); Aaron Ness, Lafayette, IN (US); Fabio Menotti, Farmington Hills, MI (US); Chris Hoops, Bellingham, WA (US); Andrew Gaarder, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/331,374

(22) Filed: Jul. 15, 2014

(65) Prior Publication Data

US 2015/0053167 A1    Feb. 26, 2015

Related U.S. Application Data

(60) Provisional application No. 61/868,156, filed on Aug. 21, 2013.

(51) Int. Cl.
*F02F 3/26* (2006.01)
*F02B 23/06* (2006.01)

(52) U.S. Cl.
CPC ............ *F02F 3/26* (2013.01); *F02B 23/0636* (2013.01)

(58) Field of Classification Search
CPC ............ F02F 3/26; F02F 3/28; F02F 23/06; F02F 23/0636; F02F 23/0675; F16J 1/00; F16J 1/09; B23P 15/10; B21K 1/18; B21K 1/185

USPC ............ 123/193.6, 197.2, 661, 41.35; 29/888.04; 92/181 R

See application file for complete search history.

(56) References Cited

U.S. PATENT DOCUMENTS 2,388,781 A * 11/1945 Dailey .......................... 92/208
2,870,754 A * 1/1959 Morris ................ F02B 23/0603
                                                              123/263

(Continued)

FOREIGN PATENT DOCUMENTS

CA          2178012 A1     12/1997
CN        201751557 U       2/2011

(Continued)

OTHER PUBLICATIONS

Wolfram MathWorld, definition of Surface of Revolution, published online at http://mathworld.wolfram.com/SurfaceofRevolution.html, p. 1.*

*Primary Examiner* — Grant Moubry (57) ABSTRACT

A piston for an internal combustion engine is disclosed. The piston includes an upper surface configured to at least partly face a cylinder head of the internal combustion engine. The upper surface includes a combustion bowl surface, and a squish face having an internal edge disposed a first distance from the longitudinal axis along a radial direction. The combustion bowl surface includes a planar surface extending radially outward from the longitudinal axis of the piston, a first concave surface disposed outside the planar surface in the radial direction, the first concave surface having a first radius of curvature, and a second concave surface disposed outside the first concave surface in the radial direction, the second concave surface having a second radius of curvature, the second radius of curvature being smaller than the first radius of curvature.

12 Claims, 5 Drawing Sheets

(56) References Cited

U.S. PATENT DOCUMENTS

| | | | |
|---|---|---|---|
| 3,240,193 A * | 3/1966 | Ephraim, Jr. et al. | 123/41.35 |
| 4,083,330 A * | 4/1978 | Morris | 123/261 |
| 4,235,202 A * | 11/1980 | Buddenhagen | 123/276 |
| 4,278,057 A * | 7/1981 | Urlaub et al. | 123/276 |
| 4,392,465 A * | 7/1983 | Wolters et al. | 123/263 |
| 4,492,194 A * | 1/1985 | Chmela et al. | 123/276 |
| 4,548,127 A * | 10/1985 | Dunn et al. | 92/220 |
| 4,593,660 A * | 6/1986 | Elsbett et al. | 123/193.6 |
| 4,643,142 A * | 2/1987 | Klomp | 123/90.28 |
| 4,651,631 A * | 3/1987 | Avezou | 92/224 |
| 4,771,748 A * | 9/1988 | Chmela et al. | 123/276 |
| 5,816,229 A | 10/1998 | Roderweiss et al. | |
| 5,868,112 A * | 2/1999 | Mahakul et al. | 123/263 |
| 5,970,946 A | 10/1999 | Shea et al. | |
| 6,732,703 B2 | 5/2004 | Eckerle et al. | |
| 6,745,745 B2 | 6/2004 | Huebler et al. | |
| 6,966,294 B2 | 11/2005 | Eckerle et al. | |
| 6,997,158 B1 | 2/2006 | Liu | |
| 7,025,031 B2 | 4/2006 | Mahakul et al. | |
| 7,131,418 B2 * | 11/2006 | Wieland | 123/193.6 |
| 7,143,738 B2 * | 12/2006 | Ganz et al. | 123/295 |
| 7,210,448 B2 | 5/2007 | Stanton et al. | |
| 7,431,012 B1 | 10/2008 | Glenn et al. | |
| 8,677,970 B2 * | 3/2014 | Venugopal et al. | 123/193.6 |
| 8,978,621 B2 * | 3/2015 | Easley | F02B 23/0624 123/193.6 |
| 2003/0226538 A1 | 12/2003 | Eckerle et al. | |
| 2005/0188944 A1 | 9/2005 | Mahakul et al. | |
| 2010/0108044 A1 | 5/2010 | Liu | |
| 2011/0253096 A1 | 10/2011 | Easley et al. | |

FOREIGN PATENT DOCUMENTS

| | | |
|---|---|---|
| DE | 3025943 | 2/1982 |
| DE | 102005044503 A1 | 4/2007 |
| EP | 0945602 | 9/1999 |
| EP | 0849448 | 3/2000 |
| EP | 1561924 A1 | 10/2005 |
| FR | 2864581 | 7/2005 |
| GB | 2016079 | 9/1979 |
| JP | S60173310 | 9/1985 |
| JP | H03210021 | 9/1991 |
| JP | 2000234521 | 8/2000 |
| WO | 98/55743 A1 | 12/1998 |

* cited by examiner

COMBUSTION ENGINE PISTON AND ENGINE USING SAME

CROSS-REFERENCE TO RELATED APPLICATIONS

The present application claims the benefit of priority to U.S. Provisional Patent Application No. 61/868,156, titled Combustion Engine Piston and Engine Using Same, filed on Aug. 21, 2013, the disclosure of which is hereby incorporated by reference in its entirety.

TECHNICAL FIELD

The present disclosure relates generally to reciprocating combustion engines. More particularly, the present disclosure relates to a piston for a reciprocating combustion engine.

BACKGROUND

Reciprocating combustion engines are known for converting chemical energy from a fuel source into reciprocating or rotating shaft power. In reciprocating engines, gas is compressed within a cylinder volume defined by a piston, an inner cylinder wall, and a cylinder head, thereby increasing both the pressure and temperature of the gas, where the gas may include a fuel, an oxidizer such as air, or combinations thereof, for example. In spark ignition engines, fuel and oxidizer are premixed upstream of the cylinder volume or within the cylinder volume, such that ignition of the premixed fuel and oxidizer is initiated by arcing an electrical spark across a gap within the cylinder volume. In compression ignition engines, a fuel-oxidizer mixture within the cylinder volume autoignites in response to a time history of temperature and pressure within the volume. More particularly, in direct injection compression ignition engines, fuel is injected into the cylinder volume near the peak of the compression cycle and ignition of the fuel and oxidizer occurs after an autoignition delay time. Heat released from combustion of the fuel-air mixture does work against the piston, which conventionally transfers the work to a rotating crankshaft through a connecting rod.

Canadian Patent Publication 2,178,012 (hereinafter "the '012 publication"), entitled "Piston," purports to address the problem of reducing combustion emissions from a reciprocating internal combustion engine. The '012 publication describes a piston with a combustion chamber in its upper surface. The combustion chamber in the '012 publication is generally cylindrical with radiused upper edges and lower edges, where the walls of the chamber meet the base of the chamber. However, the combustion chamber arrangement described in the '012 publication ties the depth of the combustion chamber to a selection of a target squish band area on a top surface of the piston and a target compression ratio, thereby limiting the geometrical degrees of freedom available to achieve other target engine metrics.

Accordingly, there is a need for an improved piston that provides geometrical degrees of freedom for satisfying target engine metrics.

SUMMARY

In one aspect, the disclosure describes a piston for an internal combustion engine including a crown having at least one cylindrical surface, the at least one cylindrical surface being centered on a longitudinal axis of the piston, a diameter of the at least one cylindrical surface defining an outer diameter of the piston; and an upper surface configured to at least partly face a cylinder head of the internal combustion engine. The upper surface includes a combustion bowl surface, and a squish face having an internal edge disposed a first distance from the longitudinal axis along a radial direction, the radial direction being normal to the longitudinal axis. The combustion bowl surface includes a planar surface extending radially outward from the longitudinal axis of the piston, a first concave surface disposed outside the planar surface in the radial direction, the first concave surface having a first radius of curvature, and a second concave surface disposed outside the first concave surface in the radial direction, the second concave surface having a second radius of curvature, the second radius of curvature being smaller than the first radius of curvature.

In another aspect, the disclosure describes a reciprocating internal combustion engine including a piston disposed within an engine cylinder. The piston includes a crown including at least one cylindrical surface, the at least one cylindrical surface being centered on a longitudinal axis of the piston, a diameter of the at least one cylindrical surface defining an outer diameter of the piston; and an upper surface configured to at least partly face a cylinder head of the reciprocating internal combustion engine. The upper surface includes a combustion bowl surface, and a squish face having an internal edge disposed a first distance from the longitudinal axis along a radial direction, the radial direction being normal to the longitudinal axis. The combustion bowl surface includes a planar surface extending radially outward from the longitudinal axis of the piston, a first concave surface disposed outside the planar surface in the radial direction, the first concave surface having a first radius of curvature, and a second concave surface disposed outside the first concave surface in the radial direction, the second concave surface having a second radius of curvature, the second radius of curvature being smaller than the first radius of curvature.

In another aspect, the disclosure describes a piston for an internal combustion engine including a crown having at least one cylindrical surface, the at least one cylindrical surface being centered on a longitudinal axis of the piston, a diameter of the at least one cylindrical surface defining an outer diameter of the piston; and an upper surface configured to at least partly face a cylinder head of the internal combustion engine. The upper surface includes a combustion bowl surface, and a squish face having an internal edge disposed a first distance from the longitudinal axis along a radial direction, the radial direction being normal to the longitudinal axis. The combustion bowl surface includes a first concave surface having a first radius of curvature, a second concave surface disposed outside the first concave surface in the radial direction, the second concave surface having a second radius of curvature, the second radius of curvature being smaller than the first radius of curvature, and a frustoconical surface disposed between the second concave surface and the squish face, the frustoconical surface facing the longitudinal axis, a diameter of the frustoconical surface decreasing along a direction of the longitudinal axis extending away from the second concave surface toward the squish face.

In another aspect, the disclosure describes a piston for an internal combustion engine including a crown having at least one cylindrical surface, the at least one cylindrical surface being centered on a longitudinal axis of the piston, a diameter of the at least one cylindrical surface defining an outer diameter of the piston; and an upper surface configured to at least partly face a cylinder head of the internal combustion engine. The upper surface includes a combustion bowl surface, and a squish face having an internal edge disposed a first distance from the longitudinal axis along a radial direction, the radial direction being normal to the longitudinal axis. The combustion bowl surface includes a planar surface extending radially outward from the longitudinal axis of the piston, a first concave surface disposed outside the planar surface in the radial direction, the first concave surface having a first radius of curvature, and a frustoconical surface disposed between the first concave surface and the squish face, the frustoconical surface facing the longitudinal axis, a diameter of the frustoconical surface decreasing along a direction of the longitudinal axis extending away from the first concave surface toward the squish face.

In another aspect, the disclosure describes a piston for an internal combustion engine including a crown having at least one cylindrical surface, the at least one cylindrical surface being centered on a longitudinal axis of the piston, a diameter of the at least one cylindrical surface defining an outer diameter of the piston, the crown defining an oil gallery therein; and an upper surface configured to at least partly face a cylinder head of the internal combustion engine. The upper surface includes a combustion bowl surface defining a combustion bowl volume, and a squish face having an internal edge disposed a first distance from the longitudinal axis along a radial direction, the radial direction being normal to the longitudinal axis. The combustion bowl surface includes a first concave surface having a first radius of curvature, and a second concave surface disposed outside the first concave surface in the radial direction, the second concave surface having a second radius of curvature, the second radius of curvature being smaller than the first radius of curvature. The oil gallery is separated from the combustion bowl volume by a wall, a first face of the wall being at least partly defined by the second concave surface, a second face of the wall at least partly defining the oil gallery, the second face of the wall being opposite the first face of the wall.

In another aspect, the disclosure describes a piston for an internal combustion engine including a crown having at least one cylindrical surface, the at least one cylindrical surface being centered on a longitudinal axis of the piston, a diameter of the at least one cylindrical surface defining an outer diameter of the piston, the crown defining an oil gallery therein; and an upper surface configured to at least partly face a cylinder head of the internal combustion engine. The upper surface includes a combustion bowl surface defining a combustion bowl volume, and a squish face having an internal edge disposed a first distance from the longitudinal axis along a radial direction, the radial direction being normal to the longitudinal axis. The combustion bowl surface includes a first concave surface having a first radius of curvature, and a frustoconical surface disposed between the first concave surface and the squish face, the frustoconical surface facing the longitudinal axis, a diameter of the frustoconical surface decreasing along a direction of the longitudinal axis extending away from the first concave surface toward the squish face. The oil gallery is separated from the combustion bowl volume by a wall, a first face of the wall being at least partly defined by the first concave surface, a second face of the wall at least partly defining the oil gallery, the second face of the wall being opposite the first face of the wall.

DETAILED DESCRIPTION

Figure 1:
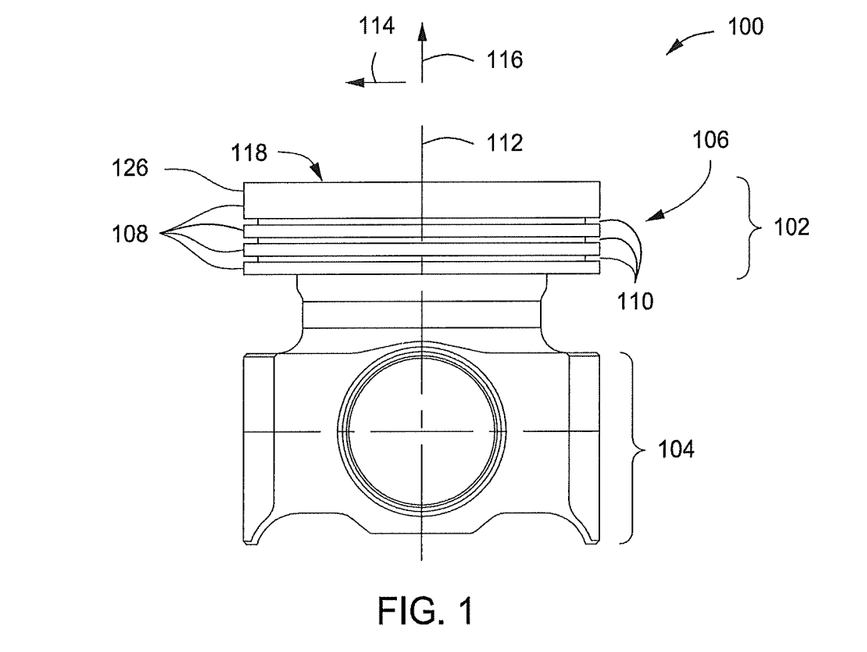
FIG. 1 shows a side view of a piston, according to an aspect of the disclosure.
Figure 2:
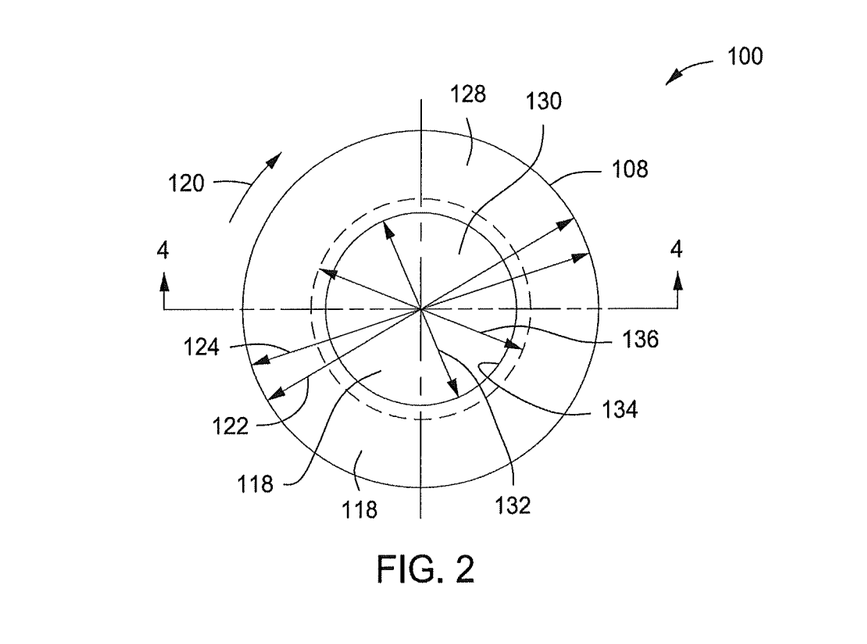
FIG. 2 shows a top view of a piston, according to an aspect of the disclosure.

It will be appreciated that FIG. 1 shows a side view of a piston 100, according to an aspect of the disclosure; and FIG. 2 shows a top view of a piston 100, according to an aspect of the disclosure. The piston 100 includes a crown portion 102 and may include a skirt portion 104. The crown portion 102 defines a circumferential ring belt 106 around a circumferential periphery of the piston 100. The circumferential ring belt 106 may include two or more cylindrical surfaces 108 defining at least one circumferential ring groove 110 therebetween. Each of the circumferential ring grooves 110 may be configured to hold a compression ring, an oil ring, or other piston ring known to persons having skill in the art.

At least one of the cylindrical surfaces 108 is centered about a longitudinal axis 112 of the piston 100. A radial direction 114 of the piston 100 extends perpendicular to the longitudinal axis 112, and a compression direction 116 of the piston 100 extends along the longitudinal axis 112 in a direction away from a top surface 118 of the piston 100. A circumferential direction 120 extends around a periphery of the piston 100 normal to the radial direction 114.

An outer diameter 122 of the piston 100 may be defined by a diameter of one of the cylindrical surfaces 108. However, it will be appreciated that each of the two or more cylindrical surfaces 108 may have a different diameter, or the same diameter. An outer diameter 124 of the top surface 118 may be defined by a diameter of an uppermost cylindrical surface 126, relative to the compression direction 116.

The top surface 118 of the piston 100 extends from the longitudinal axis 112 to the outer diameter 124 of the top surface 118. It will be appreciated that the top surface 118 of the piston 100 may include features that extend in the longitudinal direction 112, the radial direction 114, the circumferential direction 120, or combinations thereof, between the longitudinal axis 112 and the outer diameter 124 of the top surface 118.

The top surface 118 of the piston 100 may include a squish face surface 128 and a combustion bowl surface 130. According to one aspect of the disclosure, at least part of the squish face surface 128 and at least part of the combustion bowl surface 130 face the compression direction 116. Here, a surface facing the compression direction 116 may mean that a vector normal to the surface has a component in the compression direction 116. According to another aspect of the disclosure, an entirety of the squish face surface 128 faces in the compression direction 116. For example, an internal diameter 132 of the squish face 128 may be defined by an internal edge 134 of the squish face 128, and an entirety of the squish face surface 128 extending between the internal diameter 132 and the outer diameter 124 of the top surface 118 may face the compression direction 116.

According to yet another aspect of the disclosure, at least part of the combustion bowl surface 130 faces away from the compression direction 116. For example, a portion of the combustion bowl surface 130 disposed between the internal edge 134 of the squish face 128 and a diameter 136 of the combustion bowl surface 130 may lie below the squish face surface 128 along the longitudinal axis 112, and outside the internal edge 134 of the squish face 128 in the radial direction 114, such that the portion of the combustion bowl surface 130 faces away from the compression direction 116.

Figure 3:
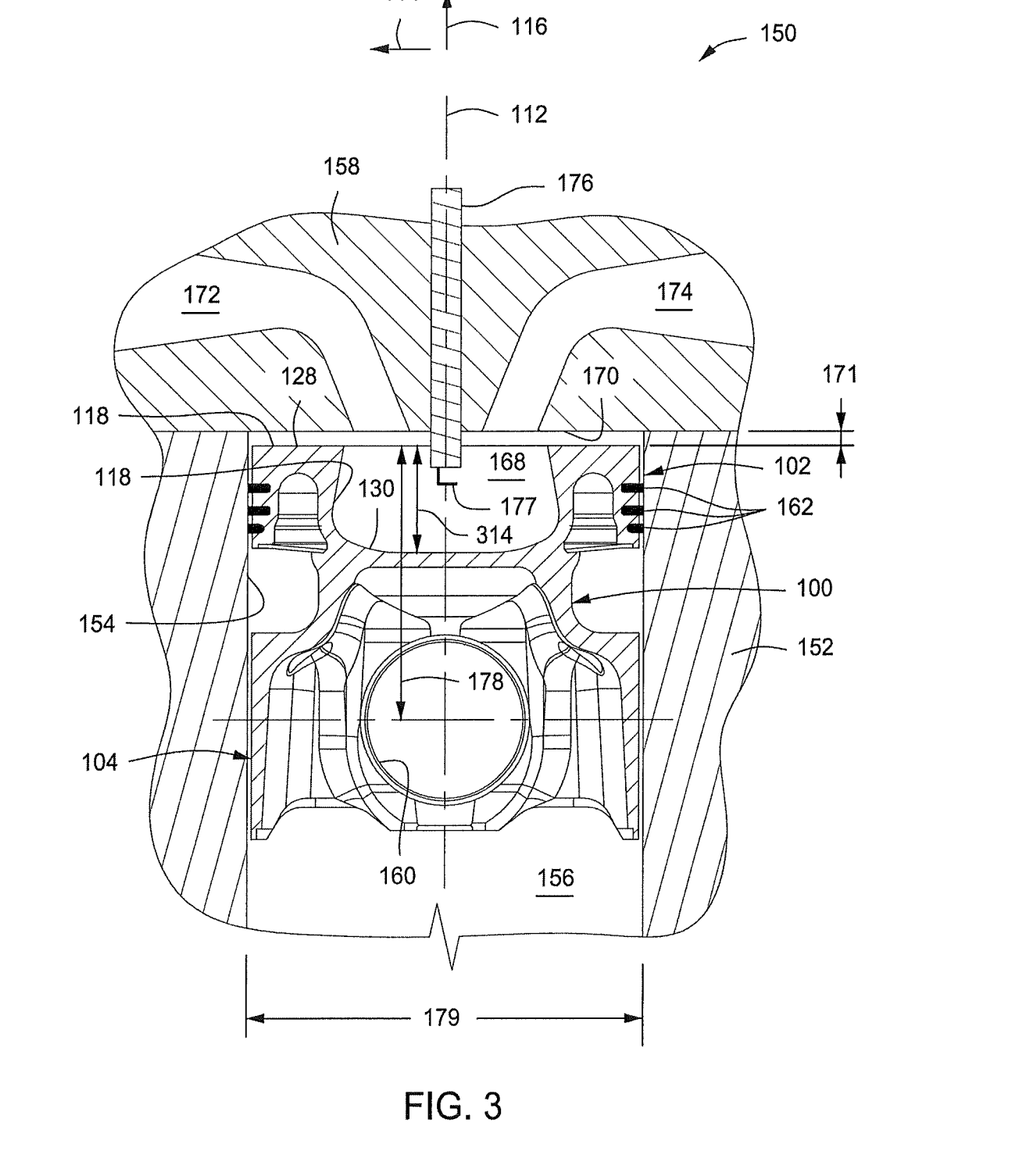
FIG. 3 shows a cross sectional schematic view of an engine, according to an aspect of the disclosure.

FIG. 3 shows a cross sectional schematic view of an engine 150, according to an aspect of the disclosure. Engine 150 includes an engine cylinder 152 with an inner surface 154 that defines a cylinder bore 156 therethrough, the piston 100 slidably disposed within the cylinder bore 156, and a cylinder head 158 disposed on top of the engine cylinder 152. The piston 100 may be operatively coupled to a crankshaft (not shown) through a connecting rod (not shown), which is pivotally coupled to a pin journal 160 of the piston 100 according to conventional approaches, for example. Further, the piston 100 may engage the inner surface 154 of the of the engine cylinder 152 through one or more rings 162 disposed in one or more ring grooves 110 (see FIG. 1). Although only one engine cylinder 152 is shown in FIG. 3, it will be appreciated that the engine 150 may include any number of engine cylinders 152 greater than or equal to one.

A combustion chamber 168 may be defined by the top surface 118 of the piston 100, including the combustion bowl surface 130 and the squish face surface 128; a piston ring 162; the inner surface 154 of the engine cylinder 152; and an inner surface 170 of the cylinder head 158. In FIG. 3 the engine 150 is shown configured with the piston 100 located near top dead center (TDC) of a compression stroke in the compression direction 116, such that a distance between the piston 100 and the cylinder head 158 is at a minimum. The piston may also be located at bottom dead center (BDC), where a distance between the piston 100 and the cylinder head 158 is at a maximum.

A compression ratio of the engine 150 may be defined as a volume of the combustion chamber 168 when the piston is at BDC divided by a volume of the combustion chamber 168 when the piston is at TDC. Thus, it will be appreciated that the compression ratio of the engine 150 may depend on parameters, such as, for example, a volume defined by the combustion bowl surface 130, a volume defined by the inner surface 170 of the cylinder head 158, a distance 171 between the squish face surface 128 and the inner surface 170 of the cylinder head 158 at TDC, a compression height 178 of the piston 100 between a centerline of the pin journal 160 and the squish face surface 128, a length of the connecting rod (not shown), and an offset distance between main bearing journals and connecting rod bearing journals of the crankshaft (not shown). According to an aspect of the disclosure, the compression height 178 ranges from about 67% to about 73% of the nominal diameter 179 of the cylinder bore 156. According to another aspect of the disclosure, the compression height 178 is about 70% of the nominal diameter 179 of the cylinder bore 156.

The cylinder head 158 may define at least one intake port 172 therethrough, at least one exhaust port 174 therethrough, or combinations thereof, such that an oxidizer or a mixture of oxidizer and fuel may enter the combustion chamber 168 via the at least one intake port 172, and combustion products may exit the combustion chamber 168 via the at least one exhaust port 174. Intake and exhaust valves may selectively block or effect fluid communication between the intake port 172 or the exhaust port 174 and the combustion chamber 168 according to conventional approaches known to persons having skill in the art, for example. Intake valves and exhaust valves are omitted from FIG. 3 to promote clarity of other features.

According to an aspect of the disclosure, the engine 150 is a spark ignition engine, including at least one spark plug 176 having an electrode 177 disposed within the combustion chamber. Thus, the engine 150 may not include a fuel injector disposed within the combustion chamber and being in fluid communication therewith. According to another aspect of the disclosure, the engine 150 may be a direct injection compression ignition engine, including a high-pressure fuel injector in the place of the at least one spark plug 176, where the high-pressure fuel injector is configured to inject fuel into the combustion chamber 168 near TDC of the compression stroke. According to yet another aspect of the disclosure, the engine 150 may be a homogeneous charge compression ignition engine that is free from either a spark plug 176 or a fuel injector that is configured to inject fuel near TDC of the compression stroke. Further, the engine 150 may operate based on a four-stroke cycle, a two-stroke cycle, or any other thermodynamic cycle for reciprocating internal combustion engines known to persons having skill in the art.

Figure 4:
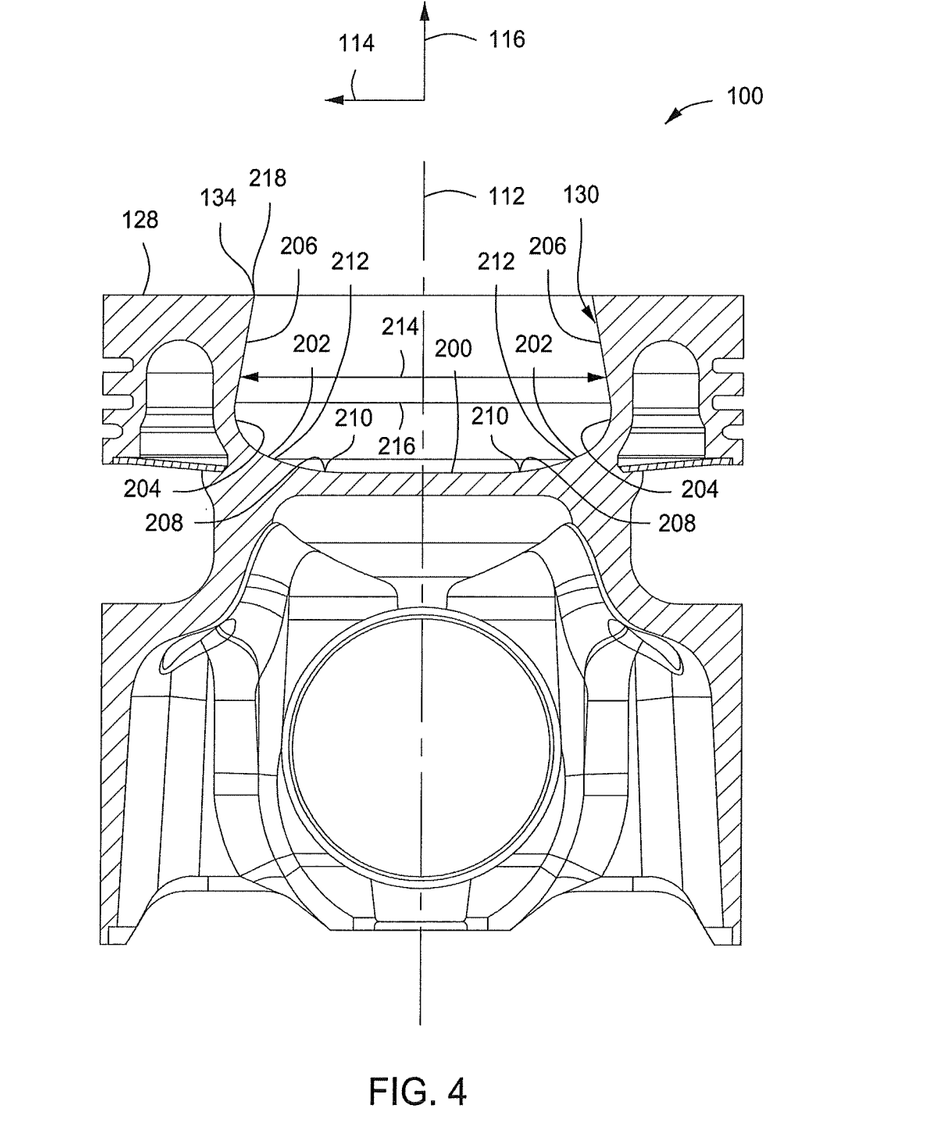
FIG. 4 shows a cross sectional view of the piston of FIG. 2 along section line 4-4, according to an aspect of the disclosure.

FIG. 4 shows a cross sectional view of a piston 100 along section line 4-4 in FIG. 2. The combustion bowl surface 130 of the piston 100 may include a planar surface 200, a first concave surface 202, a second concave surface 204, a frustoconical surface 206, combinations thereof, or other surfaces known to persons having skill in the art. Any of the planar surface 200, the first concave surface 202, the second concave surface 204, or the frustoconical surface 206 may include a surface of revolution having an axis of revolution that is concentric with the longitudinal axis 112, parallel to the longitudinal axis 112, or having another disposition relative to the longitudinal axis 112.

According to an aspect of the disclosure, the planar surface 200 is a flat surface that is substantially free from curvature within a perimeter 208 of the planar surface 200. The planar surface 200 may extend from the longitudinal axis 112 in substantially the radial direction 114 to the perimeter 208 of the planar surface 200. According to another aspect of the disclosure the planar surface 200 has a substantially circular periphery or perimeter that is substantially centered about the longitudinal axis 112. According to yet another aspect of the disclosure, the planar surface 200 defines the point of the combustion bowl surface 130 that is furthest from the squish face surface 128 along the longitudinal axis 112.

An entirety of the planar surface 200 may face the compression direction, such that a vector 188 (see FIG. 7) originating at a point on the planar surface 200 and oriented normal to the planar surface 200 may have a component along the longitudinal axis 112 pointing in the compression direction 116. Further, the vector 188 may be oriented parallel to the longitudinal axis 112.

Figure 7:
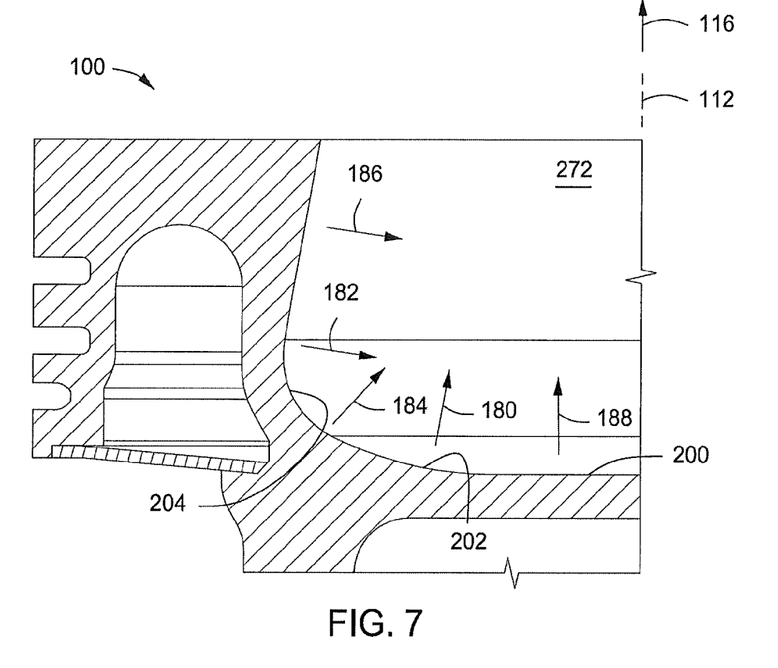
FIG. 7 shows a portion of the cross sectional view of the piston indicated as Detail A in FIG. 5.

As shown in FIG. 4, the first concave surface 202 may be disposed outside the planar surface 200 in the radial direction 114. Alternatively, it will be appreciated that the first concave surface 202 may extend from the longitudinal axis 112, such that there is no planar surface 200 within the first concave surface 202 in the radial direction 114. A concavity of the first concave surface 202 may at least partially face the compression direction 116. For example, as shown in FIG. 7, a vector 180 originating at a point on the first concave surface 202 and oriented normal to the first concave surface may have a component along the longitudinal axis 112 pointing in the compression direction 116. According to an aspect of the disclosure, an entirety of the first concave surface 202 may at least partially face the compression direction 116, such that all vectors normal to the first concave surface have a component along the longitudinal axis 112 pointing in the compression direction 116.

As shown in FIG. 4, the first concave surface 202 may abut the planar surface 200 at a first interface 210. However, it will be appreciated that one or more other surfaces may be disposed between the planar surface 200 and the first concave surface 202 to form a continuous combustion bowl surface 130. At the first interface 210, a slope of the planar surface 200 in the radial direction 114 may match a slope of the first concave surface 202 in the radial direction 114, such that a transition from the planar surface 200 to the first concave surface 202 is smooth. The planar surface 200 may have a slope in the radial direction 114 of zero at the first interface 210.

The second concave surface 204 may be disposed outside the first concave surface 202, the planar surface 200, or both in the radial direction 114, such that a concavity of the second concave surface 204 at least partially faces the compression direction 116. According to an aspect of the disclosure, a portion of the second concave surface 204 may at least partially face away from the compression direction 116. For example, as shown in FIG. 7, a vector 182 originating at a first point on the second concave surface 204 and oriented normal to the second concave surface 204 may not have a component along the longitudinal axis 112 pointing in the compression direction 116. According to another aspect of the disclosure, a portion of the second concave surface 204 may at least partially face the compression direction. For example, as shown in FIG. 7, a vector 184 originating at a second point on the second concave surface 204 and oriented normal to the second concave surface 204 may have a component along the longitudinal axis 112 pointing in the compression direction 116.

As shown in FIG. 4, the second concave surface 204 may abut the first concave surface 202 at a second interface 212. However, it will be appreciated that one or more other surfaces may be disposed between the first concave surface 202 and the second concave surface 204 to form a continuous combustion bowl surface 130. At the second interface 212, a slope of the first concave surface 202 in the radial direction 114 may match a slope of the second concave surface 204 in the radial direction 114, such that a transition from the first concave surface 202 to the second concave surface 204 is smooth. According to an aspect of the disclosure, the second concave surface 204 does not abut the squish face 128, where abutting the squish face may include a deburred surface or other sharp radius surface disposed therebetween.

The frustoconical surface 206 may be disposed outside the second concave surface 204, the first concave surface 202, the planar surface 200, or combinations thereof in the radial direction 114. According to an aspect of the disclosure, a diameter 214 of the frustoconical surface 206 may decrease in the compression direction 116 such that none of the frustoconical surface 206 faces toward the compression direction 116. For example, as shown in FIG. 7, a vector 186 originating at any point on the frustoconical surface 206 and oriented normal to the frustoconical surface 206 at the point of origin may not have a component along the longitudinal axis 112 pointing in the compression direction 116.

As shown in FIG. 4, the frustoconical surface 206 may abut the second concave surface 204 at a third interface 216. However, it will be appreciated that one or more other surfaces may be disposed between the second concave surface 204 and the frustoconical surface 206 to form a continuous combustion bowl surface 130. At the third interface 216, a slope of the second concave surface 204 in the radial direction 114 may match a slope of the frustoconical surface 206 in the radial direction 114, such that a transition from the second concave surface 204 to the frustoconical surface 206 is smooth.

The squish face surface 128 may be disposed at least partly outside the frustoconical surface 206, the second concave surface 204, the first concave surface 202, the planar surface 200, or combinations thereof in the radial direction. According to an aspect of the disclosure, all of the frustoconical surface 206 may be disposed at a radial location greater than or equal to the internal edge 134 of the squish face surface 128.

The squish face surface 128 may abut the frustoconical surface 206 at a fourth interface 218. According to one aspect of the disclosure the fourth interface 218 may be the internal edge 134 of the squish face surface 128. However, it will be appreciated that one or more surfaces may be disposed between the frustoconical surface 206 and the squish face surface 128.

At the fourth interface 218, a slope of the frustoconical surface 206 in the radial direction 114 may be different from a slope of the squish face surface 128, such that a transition from the frustoconical surface 206 to the squish face surface 128 may be sharp or abrupt. A slope of the squish face surface 128 in the radial direction 114 may be substantially zero at the fourth interface 218. Further, a slope of the squish face surface 128 in the radial direction may be substantially zero across an entirety of the squish face surface 128.

It will be appreciated that abutting surfaces described herein, such as the squish face surface 128 and the frustoconical surface 206, for example, may include a deburred edge or other sharp radius edge therebetween and still be considered abutting, as contemplated by the disclosure. According to an aspect of the disclosure, the combustion bowl surface 130 may be substantially free from any convex surfaces, such that the piston 100 may include a deburred edge or other sharp radius edge between the squish face surface 128 and the frustoconical surface 206, for example, and still have a combustion bowl surface 130 that is substantially free from any convex surfaces.

According to an aspect of the disclosure, a portion of the combustion bowl surface 130 extending from the longitudinal axis 112 to the first concave surface 202 is free from any convex curvature. According to another aspect of the disclosure, a portion of the combustion bowl surface 130 extending from the longitudinal axis 112 to the frustoconical surface 206 is free from any convex curvature. According to yet another aspect of the disclosure, a portion of the combustion bowl surface 130 extending from the longitudinal axis 112 to substantially the internal edge 134 of the squish face surface 128 is free from any convex curvature. Here, it will be understood that a portion of the combustion bowl surface 130 that extends substantially to the internal edge 134 of the squish face surface 128 may exclude a deburred edge or other sharp radius surface treatment known to persons having skill in the art where the combustion bowl surface 130 may abut the squish face surface 128.

Further, it will be understood that surfaces that are free from convex curvature may include flat planar surfaces, frustoconical surfaces, concave surfaces, or the like. An absence of convex curvature may not necessarily imply any particular surface shape among flat planar surfaces, frustoconical surfaces, concave surfaces, or the like. For example, a surface that is free from convex curvature is not necessarily flat.

Figure 5:
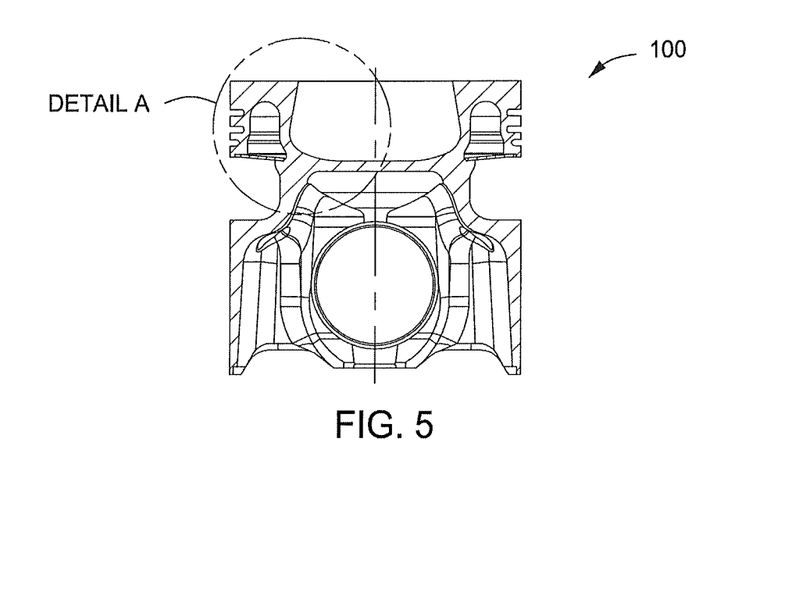
FIG. 5 shows a cross sectional view of the piston of FIG. 2 along section line 4-4, according to an aspect of the disclosure.
Figure 6:
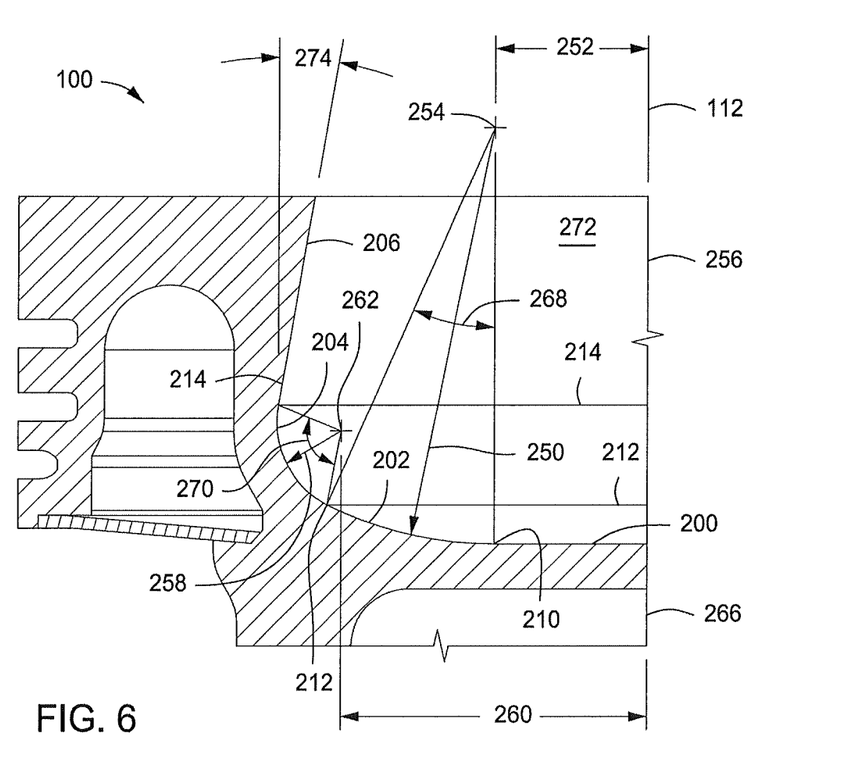
FIG. 6 shows a portion of the cross sectional view of the piston indicated as Detail A in FIG. 5.

It will be appreciated that FIG. 5 shows a cross sectional view of a piston 100 along section line 4-4 in FIG. 2; and FIG. 6 shows a portion of the cross sectional view of a piston 100 indicated as Detail A in FIG. 5. In FIG. 6, the first concave surface 202 may include a first toroidal surface having a first radius of curvature 250 and a first radius of revolution 252. The first radius of curvature extends from a first center of curvature 254 to the first concave surface 202. The first radius of revolution 252 extends from the first center of curvature 254 to a first axis of revolution 256. According to one aspect of the disclosure, the first axis of revolution 256 is parallel to the longitudinal axis 112. According to another aspect of the disclosure, the first axis of revolution 256 is coaxial with the longitudinal axis 112.

The second concave surface 204 may include a second toroidal surface having a second radius of curvature 258 and a second radius of revolution 260. The second radius of curvature extends from a second center of curvature 262 to the second concave surface 204. The second radius of revolution 260 extends from the second center of curvature 262 to a second axis of revolution 266. According to one aspect of the disclosure, the second axis of revolution 266 is parallel to the longitudinal axis 112. According to another aspect of the disclosure, the second axis of revolution 266 is coaxial with the longitudinal axis 112.

The first toroidal surface may subtend a first sector angle 268 measured about the first center of curvature 254. According to an aspect of the disclosure, the first sector angle 268 extends from the first interface 210, between the planar surface 200 and the first concave surface 202, to the second interface 212, between the first concave surface 202 and the second concave surface 204. It will be appreciated that in a configuration without a planar surface 200, the first radius of revolution 252 may be zero and the sector angle 268 may be bisected by the longitudinal axis 112. The second toroidal surface may subtend a second sector angle 270 measured about the second center of curvature 262. According to an aspect of the disclosure, the second sector angle 270 extends from the second interface 212, between the first concave surface 202 and the second concave surface 204, and the second interface 214, between the second concave surface 204 and the frustoconical surface 206.

The first sector angle 268 may range from about 10 degrees to about 150 degrees. Alternatively, in another configuration, the sector angle 268 may range from about 15 degrees to about 35 degrees. According to one aspect of the disclosure, the first sector angle 268 is about 25 degrees. The second sector angle 270 may range from about 20 degrees to about 115 degrees. Alternatively, in another configuration, the sector angle 270 may range from about 65 degrees to about 85 degrees. According to another aspect of the disclosure, the second sector angle 270 is about 75 degrees.

The first center of curvature 254 may be disposed outside a combustion bowl volume 272 defined by the combustion bowl surface 130. Similarly, the first center of curvature 254 may be disposed above the squish face surface 128 in the compression direction 116. The second center of curvature 262 may be disposed inside the volume 272. Further, the second center of curvature 262 may be disposed below the third interface 216 in the compression direction 116. According to an aspect of the disclosure, the piston 100 includes a first concave surface 202 with a first center of curvature 254 disposed outside the volume 272 defined by the combustion bowl surface 130, and a second concave surface with a second center of curvature 262 disposed within the volume 272 defined by the combustion bowl surface 130.

According to an aspect of the disclosure, the frustoconical surface 206 forms an angle 274 with the longitudinal axis 112 between about 5 degrees and about 15 degrees. According to another aspect of the disclosure, where the piston 100 has a different configuration, the frustoconical surface 206 forms an angle 274 with the longitudinal axis 112 between about 8 degrees and about 12 degrees. According to yet another aspect of the disclosure, where the piston 100 has another different configuration, the frustoconical surface 206 forms an angle 274 with the longitudinal axis 112 of about 10 degrees.

Figure 8:
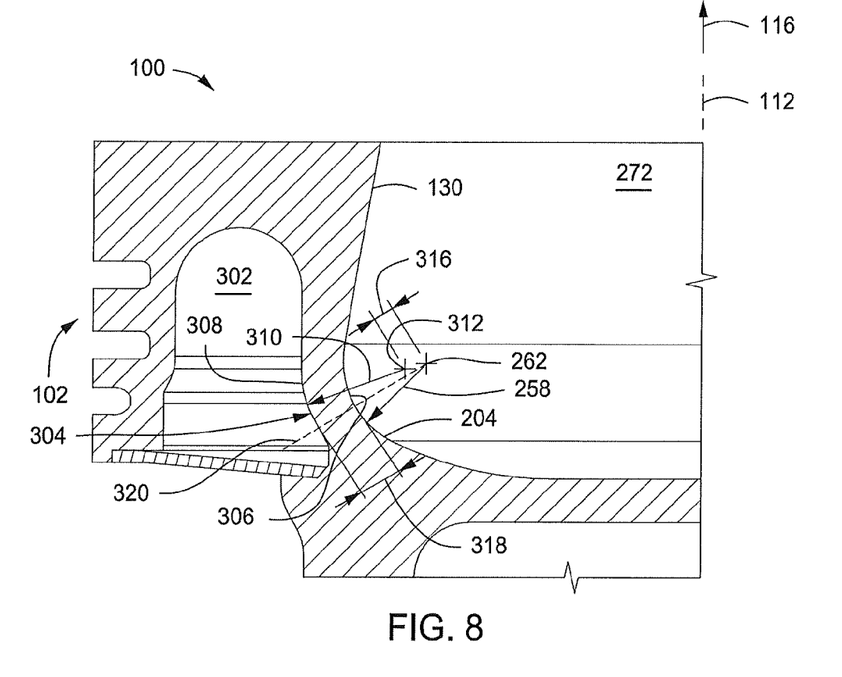
FIG. 8 shows a portion of the cross sectional view of the piston indicated as Detail A in FIG. 5.

FIG. 8 shows a portion of the cross sectional view of a piston 100 indicated as Detail A in FIG. 5. As shown in FIG. 8, the crown portion 102 defines an oil gallery 302 therein. The oil gallery 302 may be separated from combustion bowl volume 272 by a wall 304. A first face 306 of the wall 304 may be at least partly defined by the second concave surface 204 of the combustion bowl surface 130, and the wall 304 includes a second face 308 that at least partly defines the oil gallery 302, where the second face 308 is opposite the first face 306.

The second face 308 may include a convex portion facing the oil gallery 302 and having a convex radius of curvature 310 extending from a center of the convex radius of curvature 312 to the second face 308 of the wall 304. According to an aspect of the disclosure, the center of the convex radius of curvature 312 lies within the combustion bowl volume 272. According to another aspect of the disclosure, a distance 316 between the center of the convex radius of curvature 312 and the second center of curvature 262 is less than a thickness 318 of the wall 304, where the thickness 318 is measured along a line 320 extending from the second center of curvature 262 to the second concave surface 204, normal to the second concave surface 204. Accordingly, a wall so configured may provide beneficial thermal communication between the wall 304 and the oil gallery 302, while simultaneously providing beneficial mechanical strength to the crown 102 of the piston 100.

INDUSTRIAL APPLICABILITY

The present disclosure is applicable to reciprocating heat engines in general and, more particularly, to a piston 100 for a reciprocating internal combustion engine 150. The engine 150 may be adapted to burn a fuel-oxidizer mixture to release chemical energy in the form of heat energy, and convert the heat energy into mechanical shaft power for a machine. The engine may be incorporated into a machine that performs an operation associated with an industry such as, for example, mining, construction, farming, utility power generation, transportation, or any other industry known in the art. For example, the machine could be a stationary power generation set including an electric generator that is driven by the engine 150 to generate electricity. Alternatively, the machine could use shaft power from the engine 150 to drive equipment such as a pump, a compressor, or other industrial equipment that benefits from a supply of shaft power known to persons having skill in the art.

Reciprocating combustion engine performance may be evaluated by metrics such as fuel consumption, exhaust emissions composition, operational stability, and component life, for example. Increasingly stringent emissions regulations and increasing fuel prices have motivated the Applicants to develop new reciprocating combustion engine configurations and component structures to particularly reduce exhaust emissions and reduce fuel consumption. Accordingly, Applicants have discovered ways to relax design constraints associated with conventional approaches and use the new degrees of freedom to devise new approaches for simultaneously reducing emissions and fuel consumption, and improving operational stability, without compromising other metrics such as component life.

Referring to FIG. 3, translation of the piston 100 toward the cylinder head 158 may create fluid motion, or charge motion, within the combustion chamber 168. One such fluid motion pattern is the so-called squish effect, whereby fluid between the squish face 128 and the inner surface 170 of the cylinder head 158 is driven in the radial direction 114 toward the longitudinal axis 112 by motion of the piston 100 toward the cylinder head 158. In turn, a relatively high velocity radial jet of fluid may be created as the piston 100 closely approaches the cylinder head 158 on a compression stroke. The radial jet of fluid created by the squish effect may be used to beneficially increase turbulence in the combustion chamber during the combustion process. The intensity of the squish effect may be tailored by adjusting inter alia the relative area of the squish face surface 128 compared to the cylinder bore 156 diameter, and the size of the gap 171 between the squish face 128 of the piston and the inner surface 170 of the cylinder head 158, for example.

Conventional approaches, such as that described in the '012 publication discussed above, are limited in the degree of squish that may be utilized because, for a given compression or volume ratio, the squish face area is coupled with combustion bowl depth. However, Applicants discovered that the deep combustion bowl shapes resulting from conventional approaches to increasing squish face area, and therefore squish effect intensity, frustrated or forfeited benefits that might be derived from the enhanced squish effect.

In turn, Applicants have disclosed herein new combustion bowl geometries that uncouple the depth of the combustion bowl from the squish face area 128, thereby effecting higher squish intensities without the disadvantages of increasing combustion bowl depth 314 (see FIG. 3). Indeed, aspects of the present disclosure provide combustion bowl geometries that derive benefits from increases in squish effect intensity, over conventional approaches, without unduly increasing combustion bowl depth 314.

According to an aspect of the disclosure, a distance between the internal edge 134 of the squish face surface 128 and the outer diameter 122 of the piston 100 in the radial direction 114 ranges from about 18% to about 28% of the outer diameter 122 of the piston 100. According to another aspect of the disclosure, the distance between the internal edge 134 of the squish face surface 128 and the outer diameter 122 of the piston 100 in the radial direction 114 is about 23% of the outer diameter 122 of the piston 100. According to yet another aspect of the disclosure, an area of the squish face surface ranges from about 59% to about 81% of an area based on the outer diameter 122 of the piston 100. According to still yet another aspect of the disclosure, the area of the squish face surface is about 71% of an area based on the outer diameter 122 of the piston 100.

Further, aspects of the present disclosure provide these advantages without introducing complex and potentially expensive convex surfaces as part of the combustion bowl surface 130. For example, as best shown in FIG. 4, aspects of the present disclosure provide improvement to exhaust emissions and fuel economy relative to conventional approaches by employing simple surfaces such as the planar surface 202, constant radius concave surfaces 202, 204, the frustoconical surface 206, other similarly non-convex surfaces known to persons of skill, or combinations thereof.

A working example corresponding to a non-limiting aspect of the disclosure is described below. An engine 150, having multiple pistons 100 in multiple engine cylinders 152, was tested. A nominal diameter of the inner surface 154 of the engine cylinders 152 was about 6.7 inches (170 mm). A piston 100 tested had a compression height 178 of about 4.7 inches (119 mm), which is approximately 70% of the nominal diameter 179 of the cylinder bore 156. A difference between the maximum outer diameter of the piston 100 and the nominal diameter 179 of the cylinder bore 156 was less than 0.5% of the nominal diameter 179 of the cylinder bore 156.

The piston 100 tested had an annular, flat, squish face 128 extending across about 70% of the cross sectional area of the cylinder bore 156 based on the bore internal diameter 179. The squish face 128 extended from an internal diameter of about 3.6 inches (91 mm) to substantially the outer diameter of the piston 100. Further, the combustion bowl depth 314 of the piston 100 tested was about 28% of the nominal diameter 179 of the cylinder bore 156. The combustion bowl surface 130 of the piston 100 tested included a planar surface 200 extending in the radial direction 114 from the longitudinal axis 112 and abutting a first concave surface 202 having a radius of curvature 250 of about 2.2 inches (57 mm) (see FIG. 6). A circular diameter of the planar surface 200 was about 1.6 inches (40 mm). The first concave surface 202 abutted a second concave surface 204 having a radius of curvature of about 0.5 inches (12 mm), and the second concave surface 204 abutted a frustoconical surface 206 inclined at about 10 degrees with respect to the longitudinal axis 112. The frustoconical surface 206 substantially abutted the internal edge 134 of the squish face surface 128.

The engine 150 was configured for tests of the piston 100 working example to burn a pre-mixture of gaseous hydrocarbon fuel and air according to a four-stroke spark ignition cycle. The piston 100 tested effected a compression ratio or volume ratio of about 9.75:1 within the engine 150. The working example for the piston 100 effected a decrease in brake-specific fuel consumption (BSFC) over conventional approaches, ranging from about 0.5% to about 1.5% for a range discrete equivalent brake-specific exhaust NOx levels. Testing of the working example for the piston 100 also effected decreases in the covariance of cylinder indicated mean effective pressure (IMEP) of about 15% to about 35%, and decreases in total combustion time of about 5% to about 10%, over conventional approaches, for the same range of discrete equivalent brake-specific NOx levels. Decreases in the covariance of IMEP and total combustion time are indicative of more vigorous and stable combustion. It will be appreciated that these reported decreases in BSFC, covariance of IMEP, and total combustion time at constant NOx may be traded for decreases in NOx emissions or improvement in other performance metrics by adjustments to engine 150 operation known to persons having skill in the art.

Some strategies for reducing exhaust emissions, may impact component life. For example, oxides of nitrogen (collectively "NOx") in exhaust emissions may be reduced by operating the engine 150 with leaner mixtures of fuel and oxidizer than conventionally practiced. However, such lean mixtures may increase piston temperatures, result in combustion instability, or both, which may diminish piston life. Accordingly, Applicants discovered a need for improved heat transfer strategies for piston cooling in addition to improved methods for enhancing combustion stability for lean fuel-oxidizer mixtures, and aspects of the disclosure incorporate provide new piston structures addressing those needs.

As described above, Applicants have disclosed a combustion bowl surface 130 which may include two distinct concave surfaces (202 and 204 in FIGS. 4 and 6, for example) to promote heat transfer from a wall 304 to oil residing in the oil gallery 302, while simultaneously providing high mechanical strength, thereby promoting longevity of the piston 100. Further, the two distinct concave surfaces may also simultaneously contribute to providing the design flexibility to reduce exhaust emissions and fuel consumption.

An aspect of the disclosure describes a piston for an internal combustion engine, comprising:
  a crown including at least one cylindrical surface, the at least one cylindrical surface being centered on a longitudinal axis of the piston, a diameter of the at least one cylindrical surface defining an outer diameter of the piston; and
  an upper surface configured to at least partly face a cylinder head of the internal combustion engine, the upper surface including
    a combustion bowl surface, and
    a squish face having an internal edge disposed a first distance from the longitudinal axis along a radial direction, the radial direction being normal to the longitudinal axis,
    the combustion bowl surface including
    a planar surface extending radially outward from the longitudinal axis of the piston,
    a first concave surface disposed outside the planar surface in the radial direction, the first concave surface having a first radius of curvature, and
    a second concave surface disposed outside the first concave surface in the radial direction, the second concave surface having a second radius of curvature, the second radius of curvature being smaller than the first radius of curvature.

According to an aspect of the disclosure, the combustion bowl surface further includes a frustoconical surface disposed between the second concave surface and the squish face, the frustoconical surface facing the longitudinal axis, a diameter of the frustoconical surface decreasing along a direction of the longitudinal axis extending away from the planar surface toward the squish face.

According to an aspect of the disclosure, the frustoconical surface is a surface of revolution centered substantially on the longitudinal axis.

According to an aspect of the disclosure, the frustoconical surface defines an angle with respect to the longitudinal axis between about 5 degrees and about 15 degrees.

According to an aspect of the disclosure, the frustoconical surface defines an angle with respect to the longitudinal axis between about 8 degrees and about 12 degrees According to an aspect of the disclosure, the frustoconical surface defines an angle with respect to the longitudinal axis of about 10 degrees According to an aspect of the disclosure, the planar surface of the combustion bowl surface is substantially perpendicular to the longitudinal axis.

According to an aspect of the disclosure, an outer periphery of the planar surface is substantially circular.

According to an aspect of the disclosure, the substantially circular outer periphery of the planar surface is substantially centered on the longitudinal axis.

According to an aspect of the disclosure, the first concave surface includes a surface of revolution having an axis of revolution that is substantially coaxial with the longitudinal axis.

According to an aspect of the disclosure, the second concave surface includes a surface of revolution having an axis of revolution that is substantially coaxial with the longitudinal axis.

According to an aspect of the disclosure, a radially innermost edge of the first concave surface abuts an outer periphery of the planar surface, such that a radial slope of the first concave surface at the radially innermost edge of the first concave surface is equal to a radial slope of the planar surface at the outer periphery of the planar surface.

According to an aspect of the disclosure, a radially innermost edge of the second concave surface abuts a radially outermost edge of the first concave surface, such that a radial slope of the second concave surface at the radially innermost edge of the second concave surface is equal to a radial slope of the first concave surface at the radially outermost edge of the first concave surface.

According to an aspect of the disclosure, a radially outermost edge of the frustoconical surface abuts to a radially outermost edge of the second concave surface, such that a radial slope of the frustoconical surface at the radially outermost edge of the frustoconical surface is equal to a radial slope of the second concave surface at the radially outermost edge of the second concave surface.

According to an aspect of the disclosure, the frustoconical surface extends from the radially outermost edge of the second concave surface to substantially the internal edge of the squish face.

According to an aspect of the disclosure, the squish face includes a planar surface of revolution extending from the internal edge of the squish face to substantially the outer diameter of the piston.

According to an aspect of the disclosure, a radial dimension from the internal edge of the squish face to a radially outer edge of the squish face is not less than about 18% of the outer diameter of the piston.

According to an aspect of the disclosure, a radial dimension from the internal edge of the squish face to a radially outer edge of the squish face ranges between about 18% to about 27% of the outer diameter of the piston.

According to an aspect of the disclosure, a the radial dimension from the internal edge of the squish face to the radially outer edge of the squish face is about 23% of the outer diameter of the piston.

According to an aspect of the disclosure, the crown defines an oil gallery, the combustion bowl surface defines a combustion bowl volume, the oil gallery is separated from the combustion bowl volume by a wall, and the second concave surface at least partly defines a first face of the wall.

According to an aspect of the disclosure, the wall includes a second face opposite the first face, and the second face includes a convex surface facing the oil gallery.

According to an aspect of the disclosure, a distance between the first center of curvature and the second center of curvature is less than a thickness of the wall measured along a line extending from the first center of curvature to the first concave surface, the line being normal to the second concave surface.

According to an aspect of the disclosure, the planar surface includes a surface of revolution extending from the longitudinal axis to an outer periphery of the planar surface.

According to an aspect of the disclosure, the second concave surface does not abut the squish face.

An aspect of the disclosure describes a reciprocating internal combustion engine, comprising:
a piston disposed within an engine cylinder, the piston including
  a crown including at least one cylindrical surface, the at least one cylindrical surface being centered on a longitudinal axis of the piston, a diameter of the at least one cylindrical surface defining an outer diameter of the piston; and
  an upper surface configured to at least partly face a cylinder head of the reciprocating internal combustion engine, the upper surface including
    a combustion bowl surface, and
    a squish face having an internal edge disposed a first distance from the longitudinal axis along a radial direction, the radial direction being normal to the longitudinal axis,
  the combustion bowl surface including
    a planar surface extending radially outward from the longitudinal axis of the piston,
    a first concave surface disposed outside the planar surface in the radial direction, the first concave surface having a first radius of curvature, and
    a second concave surface disposed outside the first concave surface in the radial direction, the second concave surface having a second radius of curvature, the second radius of curvature being smaller than the first radius of curvature.

According to an aspect of the disclosure, the reciprocating internal combustion engine further comprises a cylinder head disposed on the engine cylinder above the piston in a compression direction, a combustion chamber being defined by the piston, an inner surface of the engine cylinder, and the cylinder head; and a spark plug having an electrode disposed within the combustion chamber.

According to an aspect of the disclosure, the reciprocating internal combustion engine further comprises a cylinder head disposed on the engine cylinder above the piston in a compression direction, a combustion chamber being defined by the piston, an inner surface of the engine cylinder, and the cylinder head; and a high-pressure fuel injector in fluid communication with the combustion chamber.

According to an aspect of the disclosure, the reciprocating internal combustion engine does not include a high-pressure fuel injector disposed in the combustion chamber and being in fluid communication with the combustion chamber.

According to an aspect of the disclosure, a compression ratio of the reciprocating internal combustion engine ranges from about 9.5:1 to about 10.5:1.

According to an aspect of the disclosure, a compression ratio of the reciprocating internal combustion engine is about 9.75:1.

An aspect of the disclosure describes a piston for an internal combustion engine, comprising:
a crown including at least one cylindrical surface, the at least one cylindrical surface being centered on a longitudinal axis of the piston, a diameter of the at least one cylindrical surface defining an outer diameter of the piston; and
an upper surface configured to at least partly face a cylinder head of the internal combustion engine, the upper surface including
  a combustion bowl surface, and
  a squish face having an internal edge disposed a first distance from the longitudinal axis along a radial direction, the radial direction being normal to the longitudinal axis,
the combustion bowl surface including
  a first concave surface having a first radius of curvature,
  a second concave surface disposed outside the first concave surface in the radial direction, the second concave surface having a second radius of curvature, the second radius of curvature being smaller than the first radius of curvature, and
  a frustoconical surface disposed between the second concave surface and the squish face, the frustoconical surface facing the longitudinal axis, a diameter of the frustoconical surface decreasing along a direction of the longitudinal axis extending away from the second concave surface toward the squish face.

According to an aspect of the disclosure, the combustion bowl surface further includes a planar surface disposed inside the first concave surface in the radial direction.

According to an aspect of the disclosure, the planar surface has a circular periphery that is substantially centered on the longitudinal axis.

An aspect of the disclosure describes a piston for an internal combustion engine, comprising:
a crown including at least one cylindrical surface, the at least one cylindrical surface being centered on a longitudinal axis of the piston, a diameter of the at least one cylindrical surface defining an outer diameter of the piston; and
an upper surface configured to at least partly face a cylinder head of the internal combustion engine, the upper surface including
  a combustion bowl surface, and
  a squish face having an internal edge disposed a first distance from the longitudinal axis along a radial direction, the radial direction being normal to the longitudinal axis,
the combustion bowl surface including
  a planar surface extending radially outward from the longitudinal axis of the piston,
  a first concave surface disposed outside the planar surface in the radial direction, the first concave surface having a first radius of curvature, and
  a frustoconical surface disposed between the first concave surface and the squish face, the frustoconical surface facing the longitudinal axis, a diameter of the frustoconical surface decreasing along a direction of the longitudinal axis extending away from the first concave surface toward the squish face.

According to an aspect of the disclosure, the piston for the internal combustion engine further comprises a second concave surface disposed outside the first concave surface in the radial direction, the second concave surface having a second radius of curvature that is different from the first radius of curvature.

According to an aspect of the disclosure, the first radius of curvature is greater than the second radius of curvature.

An aspect of the disclosure describes a piston for an internal combustion engine, comprising:
a crown including at least one cylindrical surface, the at least one cylindrical surface being centered on a longitudinal axis of the piston, a diameter of the at least one cylindrical surface defining an outer diameter of the piston, the crown defining an oil gallery therein; and
an upper surface configured to at least partly face a cylinder head of the internal combustion engine, the upper surface including a combustion bowl surface defining a combustion bowl volume, and a squish face having an internal edge disposed a first distance from the longitudinal axis along a radial direction, the radial direction being normal to the longitudinal axis, wherein the combustion bowl surface includes a first concave surface having a first radius of curvature, and a second concave surface disposed outside the first concave surface in the radial direction, the second concave surface having a second radius of curvature, the second radius of curvature being smaller than the first radius of curvature, and wherein the oil gallery is separated from the combustion bowl volume by a wall, a first face of the wall being at least partly defined by the second concave surface, a second face of the wall at least partly defining the oil gallery, the second face of the wall being opposite the first face of the wall.

According to an aspect of the disclosure, the second face includes a convex surface facing the oil gallery.

According to an aspect of the disclosure, a distance between the first center of curvature and the second center of curvature is less than a thickness of the wall measured along a line extending from the first center of curvature to the first concave surface, the line being normal to the second concave surface.

An aspect of the disclosure describes a piston for an internal combustion engine, comprising:

a crown including at least one cylindrical surface, the at least one cylindrical surface being centered on a longitudinal axis of the piston, a diameter of the at least one cylindrical surface defining an outer diameter of the piston, the crown defining an oil gallery therein; and an upper surface configured to at least partly face a cylinder head of the internal combustion engine, the upper surface including a combustion bowl surface defining a combustion bowl volume, and a squish face having an internal edge disposed a first distance from the longitudinal axis along a radial direction, the radial direction being normal to the longitudinal axis, wherein the combustion bowl surface includes a first concave surface having a first radius of curvature, and a frustoconical surface disposed between the first concave surface and the squish face, the frustoconical surface facing the longitudinal axis, a diameter of the frustoconical surface decreasing along a direction of the longitudinal axis extending away from the first concave surface toward the squish face, and wherein the oil gallery is separated from the combustion bowl volume by a wall, a first face of the wall being at least partly defined by the first concave surface, a second face of the wall at least partly defining the oil gallery, the second face of the wall being opposite the first face of the wall.

According to an aspect of the disclosure, the second face includes a convex surface facing the oil gallery.

According to an aspect of the disclosure, a distance between the first center of curvature and the second center of curvature is less than a thickness of the wall measured along a line extending from the first center of curvature to the first concave surface, the line being normal to the first concave surface.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A piston for an internal combustion engine, comprising:

a crown including at least one cylindrical surface, the at least one cylindrical surface being centered on a longitudinal axis of the piston, a diameter of the at least one cylindrical surface defining an outer diameter of the piston; and an upper surface configured to at least partly face a cylinder head of the internal combustion engine, the upper surface including a combustion bowl surface, and a squish face having an internal edge disposed a first distance from the longitudinal axis along a radial direction, the radial direction being normal to the longitudinal axis, the combustion bowl surface including a planar surface extending radially outward from the longitudinal axis of the piston, a first concave surface disposed outside the planar surface in the radial direction, the first concave surface having a first radius of curvature, a second concave surface disposed outside the first concave surface in the radial direction, the second concave surface having a second radius of curvature, the second radius of curvature being smaller than the first radius of curvature, wherein a radially innermost edge of the second concave surface abuts a radially outermost edge of the first concave surface, such that a radial slope of the second concave surface at the radially innermost edge of the second concave surface is equal to a radial slope of the first concave surface at the radially outermost edge of the first concave surface, and a frustoconical surface disposed between the second concave surface and the squish face, the frustoconical surface facing the longitudinal axis, a diameter of the frustoconical surface decreasing along a direction of the longitudinal axis extending away from the planar surface toward the squish face, and the frustoconical surface is a surface of revolution centered substantially on the longitudinal axis, and the frustoconical surface defines an angle with respect to the longitudinal axis between about 5 degrees and about 15 degrees, the frustoconical surface being free from convex curvature.

2. The piston according to claim 1, wherein the planar surface of the combustion bowl surface is substantially perpendicular to the longitudinal axis.

3. The piston according to claim 1, wherein the second concave surface includes a surface of revolution having an axis of revolution that is substantially coaxial with the longitudinal axis.

4. The piston according to claim 1, wherein a radially outermost edge of the frustoconical surface abuts to a radially outermost edge of the second concave surface, such that a radial slope of the frustoconical surface at the radially outermost edge of the frustoconical surface is equal to a radial slope of the second concave surface at the radially outermost edge of the second concave surface.

5. The piston according to claim 4, wherein the frustoconical surface extends from the radially outermost edge of the second concave surface to substantially the internal edge of the squish face.

6. The piston according to claim 1, wherein the squish face includes a planar surface of revolution extending from the internal edge of the squish face to substantially the outer diameter of the piston.

7. The piston according to claim 6, wherein a radial dimension from the internal edge of the squish face to a radially outer edge of the squish face is not less than about 18% of the outer diameter of the piston.

8. The piston according to claim 1, wherein
the crown defines an oil gallery,
the combustion bowl surface defines a combustion bowl volume,
the oil gallery is separated from the combustion bowl volume by a wall, and
the second concave surface at least partly defines a first face of the wall.

9. The piston according to claim 8, wherein the wall includes a second face opposite the first face, and the second face includes a convex surface facing the oil gallery.

10. The piston according to claim 1, wherein the second concave surface does not abut the squish face.

11. A reciprocating internal combustion engine, comprising:
a piston disposed within an engine cylinder, the piston including
a crown including at least one cylindrical surface, the at least one cylindrical surface being centered on a longitudinal axis of the piston, a diameter of the at least one cylindrical surface defining an outer diameter of the piston; and
an upper surface configured to at least partly face a cylinder head of the reciprocating internal combustion engine, the upper surface including
a combustion bowl surface, and
a squish face having an internal edge disposed a first distance from the longitudinal axis along a radial direction, the radial direction being normal to the longitudinal axis,
the combustion bowl surface including
a planar surface extending radially outward from the longitudinal axis of the piston,
a first concave surface disposed outside the planar surface in the radial direction, the first concave surface having a first radius of curvature,
a second concave surface disposed outside the first concave surface in the radial direction, the second concave surface having a second radius of curvature, the second radius of curvature being smaller than the first radius of curvature, wherein a compression ratio of the reciprocating internal combustion engine ranges from about 9.5:1 to about 10.5:1, wherein a radially innermost edge of the second concave surface abuts a radially outermost edge of the first concave surface, such that a radial slope of the second concave surface at the radially innermost edge of the second concave surface is equal to a radial slope of the first concave surface at the radially outermost edge of the first concave surface, and
a frustoconical surface disposed between the second concave surface and the squish face, the frustoconical surface facing the longitudinal axis, a diameter of the frustoconical surface decreasing along a direction of the longitudinal axis extending away from the planar surface toward the squish face, and the frustoconical surface is a surface of revolution centered substantially on the longitudinal axis, and the frustoconical surface defines an angle with respect to the longitudinal axis between about 5 degrees and about 15 degrees, the frustoconical surface being free from convex curvature.

12. The reciprocating internal combustion engine according to claim 11, further comprising:
the cylinder head disposed on the engine cylinder above the piston in a compression direction, a combustion chamber being defined by the piston, an inner surface of the engine cylinder, and the cylinder head; and
a spark plug having an electrode disposed within the combustion chamber.

* * * * *